US011157035B2

United States Patent
Liang

(10) Patent No.: US 11,157,035 B2
(45) Date of Patent: Oct. 26, 2021

(54) REMOTE CONTROL DEVICE AND UNMANNED AERIAL VEHICLE

(71) Applicant: AUTEL ROBOTICS CO., LTD., Guangdong (CN)

(72) Inventor: Zhiying Liang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/441,701

(22) Filed: Jun. 14, 2019

(65) Prior Publication Data
US 2019/0332134 A1  Oct. 31, 2019

Related U.S. Application Data

(63) Continuation of application No. PCT/CN2017/113148, filed on Nov. 27, 2017.

(30) Foreign Application Priority Data

Dec. 20, 2016  (CN) .......................... 201611187947.3

(51) Int. Cl.
*B64C 39/02* (2006.01)
*G05D 1/00* (2006.01)
(Continued)

(52) U.S. Cl.
CPC .......... *G05G 9/047* (2013.01); *B64C 39/024* (2013.01); *G05D 1/0016* (2013.01); *G05G 1/04* (2013.01);
(Continued)

(58) Field of Classification Search
CPC .... G05G 9/047; G05G 1/04; G05G 2201/146; G05G 2009/0474; G05G 2505/00;
(Continued)

(56) References Cited

U.S. PATENT DOCUMENTS 10,657,627 B2 * 5/2020 Douady-Pleven ..... B64D 47/08
2003/0086241 A1 * 5/2003 Tseng .................... G06F 1/1681
361/679.27
(Continued)

FOREIGN PATENT DOCUMENTS

CN  2572116 Y  9/2003
CN  102339090 A  2/2012
(Continued)

OTHER PUBLICATIONS

EPO Machine Translation of CN2572116(Y), Lu, Sep. 10, 2003 (Year: 2003).*
(Continued)

*Primary Examiner* — Vinh Luong

(57) ABSTRACT

Embodiments of the present disclosure include a remote control device and an unmanned aerial vehicle. The remote control device includes: a display screen, a rotating shaft, a remote control body and a security lock mechanism. The remote control body includes: a housing and a joystick. The display screen can rotate around the rotating shaft. The security lock mechanism is connected to the rotating shaft.

(Continued)

When the display screen is rotated towards the housing by an angle during screen closing, the security lock mechanism in a first state locks the display screen to stop the display screen from being continued to rotate.

18 Claims, 14 Drawing Sheets

(51) Int. Cl.
*G05G 9/047* (2006.01)
*G05G 1/04* (2006.01)

(52) U.S. Cl.
CPC .............. *B64C 2201/146* (2013.01); *G05G 2009/0474* (2013.01); *G05G 2505/00* (2013.01)

(58) Field of Classification Search
CPC ...... G05G 5/05; B64C 39/024; G05D 1/0016; G08C 2201/60; G08C 17/02; H04L 65/602; H04N 21/43637; H04N 21/440281; H04N 5/2253; H04N 7/185; A63H 30/04; E05D 3/122; E05D 3/12; E05D 11/082; G06F 1/1681; G06F 1/1618
See application file for complete search history.

(56) References Cited

U.S. PATENT DOCUMENTS

| | | | |
|---|---|---|---|
| 2005/0204509 A1* | 9/2005 | Lin | G06F 1/1616 16/342 |
| 2013/0091666 A1 | 4/2013 | Carmonius et al. | |
| 2013/0322011 A1* | 12/2013 | Yeh | G06F 1/1669 361/679.44 |
| 2016/0201367 A1* | 7/2016 | Kato | G06F 1/1681 361/679.09 |
| 2017/0006340 A1* | 1/2017 | Enke | H04N 21/440281 |
| 2018/0017989 A1* | 1/2018 | Tamura | G06F 1/1662 |

FOREIGN PATENT DOCUMENTS

| | | | |
|---|---|---|---|
| CN | 103587357 A | 2/2014 | |
| CN | 106781383 A | 5/2017 | |
| CN | 106802818 A | 6/2017 | |
| CN | 206497557 U | 9/2017 | |
| WO | WO 2018113482 A1 * | 6/2018 | ............. G05G 9/047 |

OTHER PUBLICATIONS

International Search Report dated Feb. 28, 2018; PCT/CN2017/113148.

Chinese Office Action dated Jun. 27, 2019; Application No. 201810695090.9.

* cited by examiner

REMOTE CONTROL DEVICE AND UNMANNED AERIAL VEHICLE

CROSS REFERENCE TO RELATED APPLICATIONS

The present application is a continuation of International Application NO. PCT/CN2017/113148, filed on Nov. 27, 2017, which claims priority to Chinese Patent Application No. 201611187947.3, filed on Dec. 20, 2016 and entitled "REMOTE CONTROL DEVICE OF UNMANNED AERIAL VEHICLE", both of which are incorporated herein by reference in their entireties.

BACKGROUND

Technical Field

The present invention relates to the field of remote controller technologies, and in particular, to a remote control device and an unmanned aerial vehicle.

Related Art

An unmanned aerial vehicle is an unmanned airplane controlled by using a radio remote control device and a self-contained program control apparatus. Unmanned aerial vehicles are mainly applied to the military field in early stage, and with development of science, application of the unmanned aerial vehicles are gradually expanded to the consumption field. Currently, the unmanned aerial vehicle is widely applied to various fields such as street scene shooting, move and TV drama shooting, environmental monitoring, geological prospecting, map drawing and agriculture, forestry and husbandry monitoring.

The radio remote control device of the unmanned aerial vehicle may be a remote control device containing a display screen. As shown in FIG. 1a, a remote control device 100 includes a remote control body 101 and a display screen 102. The remote control body 101 includes a housing 1011, a control mainboard and a joystick 1012 that are disposed in the housing 1011. The display screen 102 is connected to the housing 1011 by using a rotating shaft 103 and rotates around the rotating shaft 103 to implement screen opening and screen closing.

Generally, in a process of closing the display screen 102, as shown in FIG. 1b, the joystick 1012 needs to be folded and laid flat first. However, if the joystick 1012 is forgotten to be folded and laid flat, as shown in FIG. 1c, the display screen 102 conflicts with the joystick 1012. Consequently, the display screen 102 is easily damaged.

SUMMARY

To resolve a technical problem in the prior art that a display screen of a remote control device is easily damaged because the display screen conflicts with a joystick, the present invention provides a remote control device and an unmanned aerial vehicle including the remote control device.

The present invention provides a remote control device, including:
a display screen;
a rotating shaft; and
a remote control body, including:
a housing;
a joystick, disposed in the housing, where the joystick can be erected or laid flat relative to the housing; and
a security lock mechanism, disposed in the housing, where
the display screen is connected to the housing by using the rotating shaft and the display screen can rotate around the rotating shaft, and the security lock mechanism is connected to the rotating shaft;
when the display screen is rotated towards the housing by an angle during screen closing, the security lock mechanism in a first state locks the display screen to stop the display screen from being continued to rotate; and
when an external force is applied to the security lock mechanism, the security lock mechanism is switched from the first state to a second state, the security lock mechanism removes the stopping to the display screen, and the display screen is continued to rotate to complete the screen closing.

Optionally, the security lock mechanism includes:
a connection apparatus, connected to the rotating shaft, where the connection apparatus includes a first bump mechanism, and the first bump mechanism can rotate with rotation of the rotating shaft;
a twistlock apparatus, mounted in the housing, where when the first bump mechanism rotates with rotation of the rotating shaft by an angle, an end portion that is of the twistlock apparatus and that is close to the connection apparatus is engaged with the first bump mechanism to stop rotation of the connection apparatus to stop rotation of the display screen; and
a button apparatus, mounted in the housing and engaged with the twistlock apparatus, where when the external force is applied to the button apparatus, the twistlock apparatus is driven to move away from the connection apparatus, the end portion of the twistlock apparatus is detached from the first bump mechanism, and the rotating shaft drives the first bump mechanism to continue to rotate.

Optionally, the connection apparatus further includes:
a screen fixing support, fixedly connected to the rotating shaft, where the screen fixing support rotates with rotation of the rotating shaft; and
a coupling shaft, fixedly connected to the screen fixing support, where the coupling shaft rotates with rotation of the screen fixing support, and
the first bump mechanism is sleeved over the coupling shaft and rotates with rotation of the coupling shaft.

Optionally, the twistlock apparatus includes:
a twistlock fixing support, fixed in the housing, where an end portion that is close to the connection apparatus is provided with a first hook;
a twistlock body, where an end portion that is far away from the connection apparatus is provided with a second hook; and
an elastic connecting piece, where one end of the elastic connecting piece is fastened to the first hook of the twistlock fixing support and the other end is fastened to the second hook of the twistlock body.

Optionally, the twistlock fixing support is provided with a long hole, the twistlock body is provided with a through hole, the twistlock body is connected to the twistlock fixing support by using a connecting piece passing through the long hole of the twistlock fixing support and the through hole of the twistlock body, the connecting piece and the long hole are in clearance fit, and the twistlock body can move relative to the twistlock fixing support.

Optionally, the button apparatus includes:

a button support, mounted in the housing; and a button body, mounted on the button support, where a button portion of the button body can be moved downward the button support under action of the external force, where a side portion of the button body is provided with a button bump, the other end portion of the twistlock apparatus is provided with a bent portion that cooperates with the button portion of the button body, the bent portion is located at an outer side of the button bump, and when the button portion is moved downward, the button bump of the button body presses the bent portion, to drive the twistlock apparatus to move away from the connection apparatus.

Optionally, the button apparatus further includes an elastic pressing piece provided in an inner cavity of the button body, the elastic pressing piece is sleeved over a cylinder on the button support, and the button body can be bounced and returned back under action of an elastic force of the elastic pressing piece.

Optionally, the bent portion has an inclined sliding surface engaged with the button bump.

Optionally, the side portion of the button body is provided with a clamping extension portion, the button support has a mounting wall configured to mount the button body, a side surface of the mounting wall is provided with a protrusion, and the protrusion is clamped to an opening of the clamping extension portion.

Optionally, the security lock mechanism further includes a button lock apparatus, and the button lock apparatus includes:

a button lock body, mounted on the button support, where the button lock body can horizontally move relative to the button support, one end portion that is of the button lock body and that is far away from the connection apparatus is provided with a blocking channel, and a first protrusion extends from the end portion to a length direction of the button lock body; and an elastic pushing piece, sleeved over a strut of the button support of the button apparatus, where one end of the elastic pushing piece is located in the blocking channel and the other end freely extends onto a base plate of the button support, and when the external force is applied to the button body, a side portion of the button portion pushes the elastic pushing piece to rotate, to make the button lock body to move toward the button body, and when the button lock body is moved to a preset location, the first protrusion of the button lock body locks the button portion, to stop the button portion from bouncing upward when the external force is withdrawn.

Optionally, the button portion is provided with a clamping portion, the clamping portion has an opening, and the button lock body locks the button portion by clamping the first protrusion and the clamping portion.

Optionally, the connection apparatus further includes a second bump mechanism, and the second bump mechanism rotates with rotation of the rotating shaft;

a second protrusion extends from one end that is of the button lock body and that is close to the connection apparatus in a width direction of the button lock body; and the second protrusion is configured to cooperate with the second bump mechanism, to drag the button lock body to move away from the button body under action of the second bump mechanism to the second protrusion, so that the first protrusion of the button lock body is detached from the button body, the button body bounces and returns back under action of an elastic force of the elastic pressing piece, the security lock apparatus is switched from the second state to a third state, the first state is a steady lock state, the second state is an unlock state, and the third state is an intermediate state in which the steady lock state is not recovered.

Optionally, a bump of the first bump mechanism and a bump of the second the bump mechanism are staggered.

Optionally, each of the first bump mechanism and the second bump mechanism is of an independent cam structure, or each of the first bump mechanism and the second the bump mechanism is of an integral structure.

Optionally, the middle of the button lock body is provided with a long hole, the button lock apparatus is mounted on the button support of the button apparatus by using a fastening piece passing through the long hole, and the fastening piece and the long hole are in clearance fit.

The present invention further provides an unmanned aerial vehicle, including a body of the unmanned aerial vehicle and the remote control device described above, where the remote control device is configured to control the body of the unmanned aerial vehicle to fly.

The technical solutions provided in the embodiments of the present invention may include the following beneficial effects:

According to the remote control device and the unmanned aerial vehicle including the remote control device in the present invention, the security lock apparatus is disposed in the housing of the remote control device. When the display screen is closing and is rotated by an angle to lock the display screen to stop the display screen from being continued to rotate. When an external force is applied to the security lock apparatus, the security lock apparatus removes the stopping to the display screen, so that the display screen is continued to rotate to complete the screen closing. In the present invention, a user is reminded to fold and lay the joystick of the remote control device flat by using the security lock mechanism. In this way, a case in which during the screen closing, the display screen conflicts with the joystick that is not laid flat is avoid, thereby preventing the display screen from being damaged.

It should be understood that the above general descriptions and the following detailed descriptions are merely exemplary, and are not intended to limit the present invention.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive drawings of other embodiments from these accompanying drawings without creative efforts.

The accompanying drawings, which are incorporated herein and constitute a part of this specification, illustrate embodiments consistent with the present invention, and are used to explain the principle of the present invention together with this specification.

FIG. 3b is a top view of FIG. 3a;

DETAILED DESCRIPTION

To further describe the principle and the structure of the present invention, preferred embodiments of the present invention are described in detail with reference to the accompanying drawings.

In the descriptions of the present invention, it should be noted that orientations or location relationships indicated by the terms "center", "up", "down", "left", "right", "vertical", "horizontal", "inside" and "outside" are orientations or location relationships indicated based on the accompanying drawings, and are merely used for ease of describing the present invention and for ease of simplifying descriptions, rather than for indicating or implying that the indicated apparatus or component must have a particular orientation or must be constructed or operated in a particular orientation, and therefore, cannot be construed as a limitation to the present invention. In addition, the terms "first", "second", and the like are merely used for purposes of descriptions and are not intended to indicate or imply relative importance.

In the descriptions of the present invention, it should be noted that unless otherwise explicitly specified and defined, terms such as "mounting", "connected to each other" and "connection" should be understood in a broad sense. For example, a connection may be a fixed connection, a detachable connection, or an integral connection; or may be a mechanical connection or an electrical connection; or may be a direct connection, an indirect connection implemented by using an intermediate medium; or may be an internal connection between two elements. A person of ordinary skill in the art may understand specific meanings of the foregoing terms in the present invention based on a specific situation.

Figure 1A:
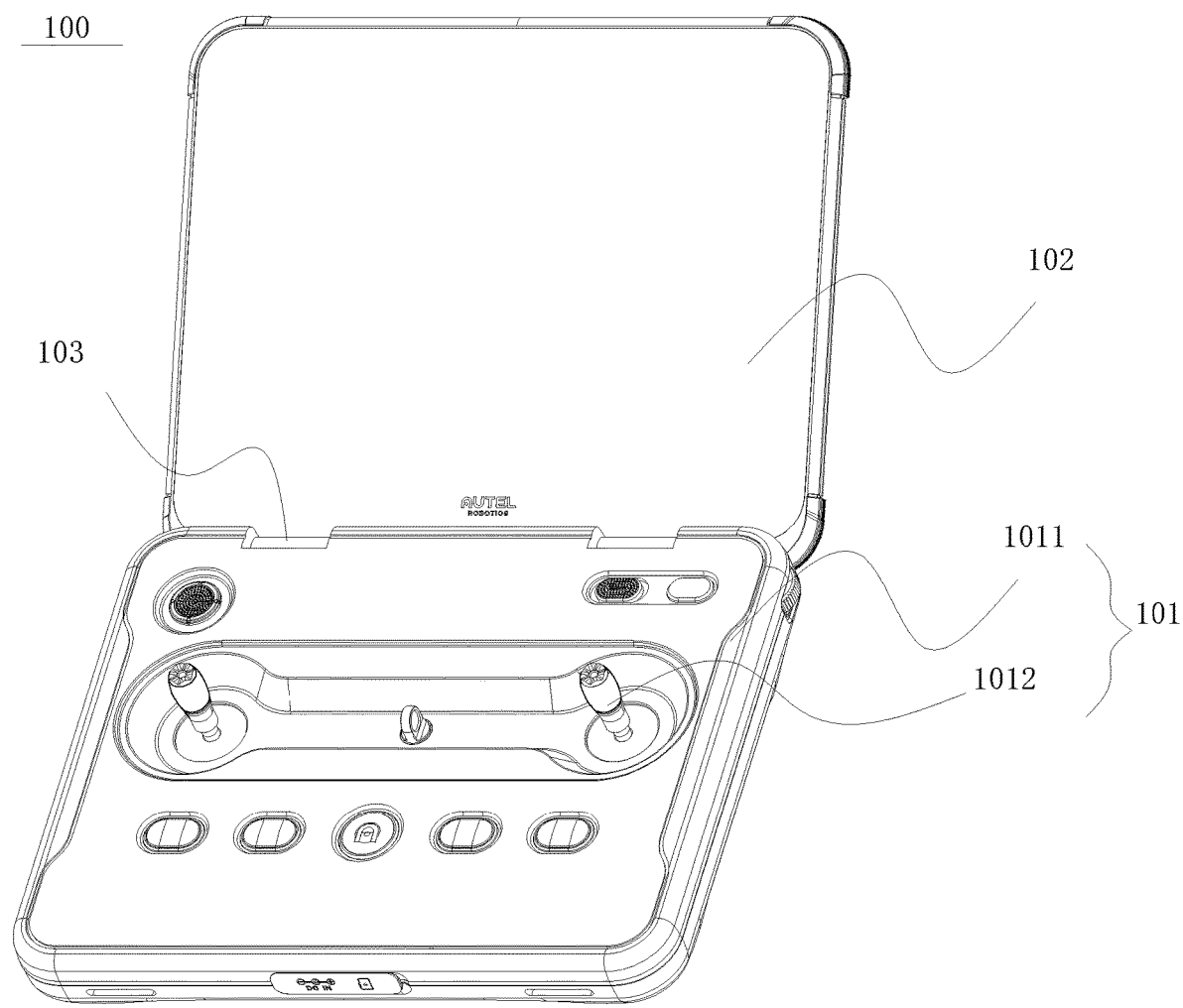
FIG. 1a to FIG. 1c each are a schematic structural diagram of a remote control device in the conventional technology.
Figure 1B:
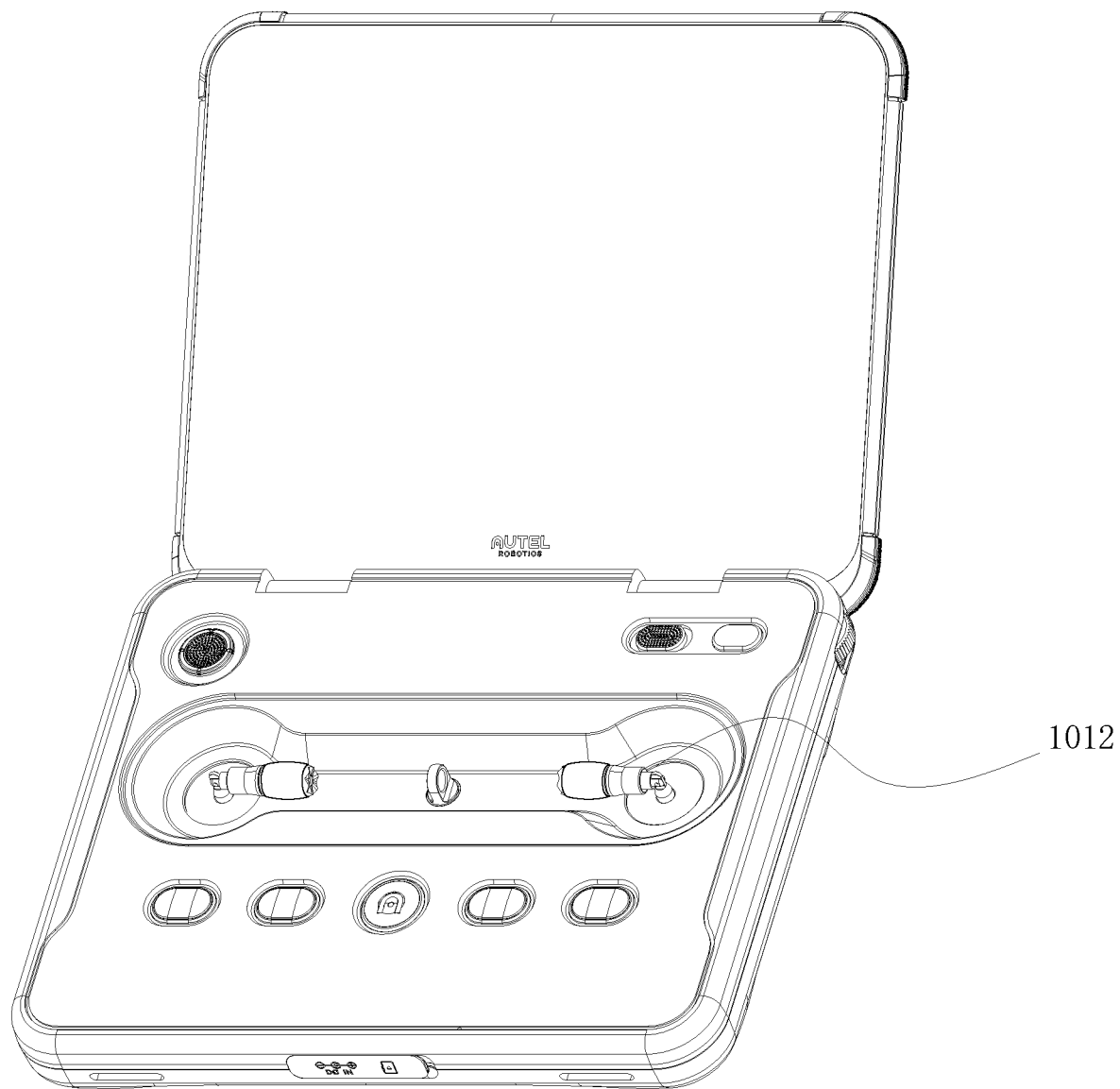
Figure 1C:
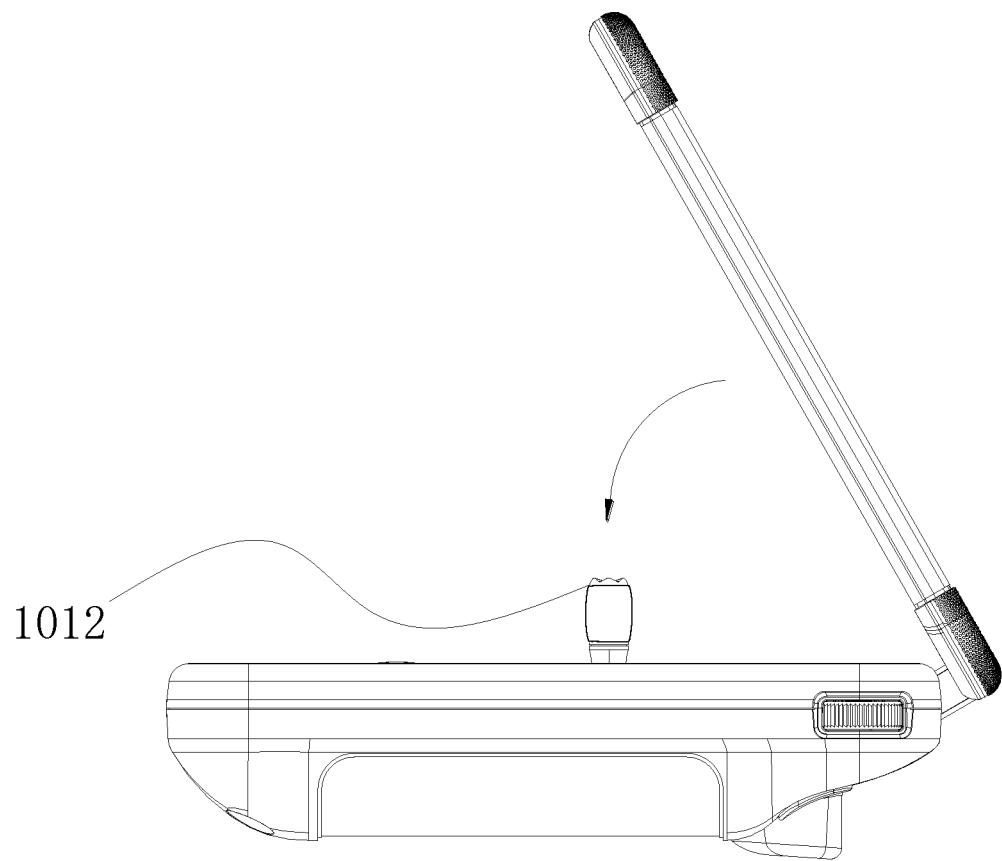
Figure 2:
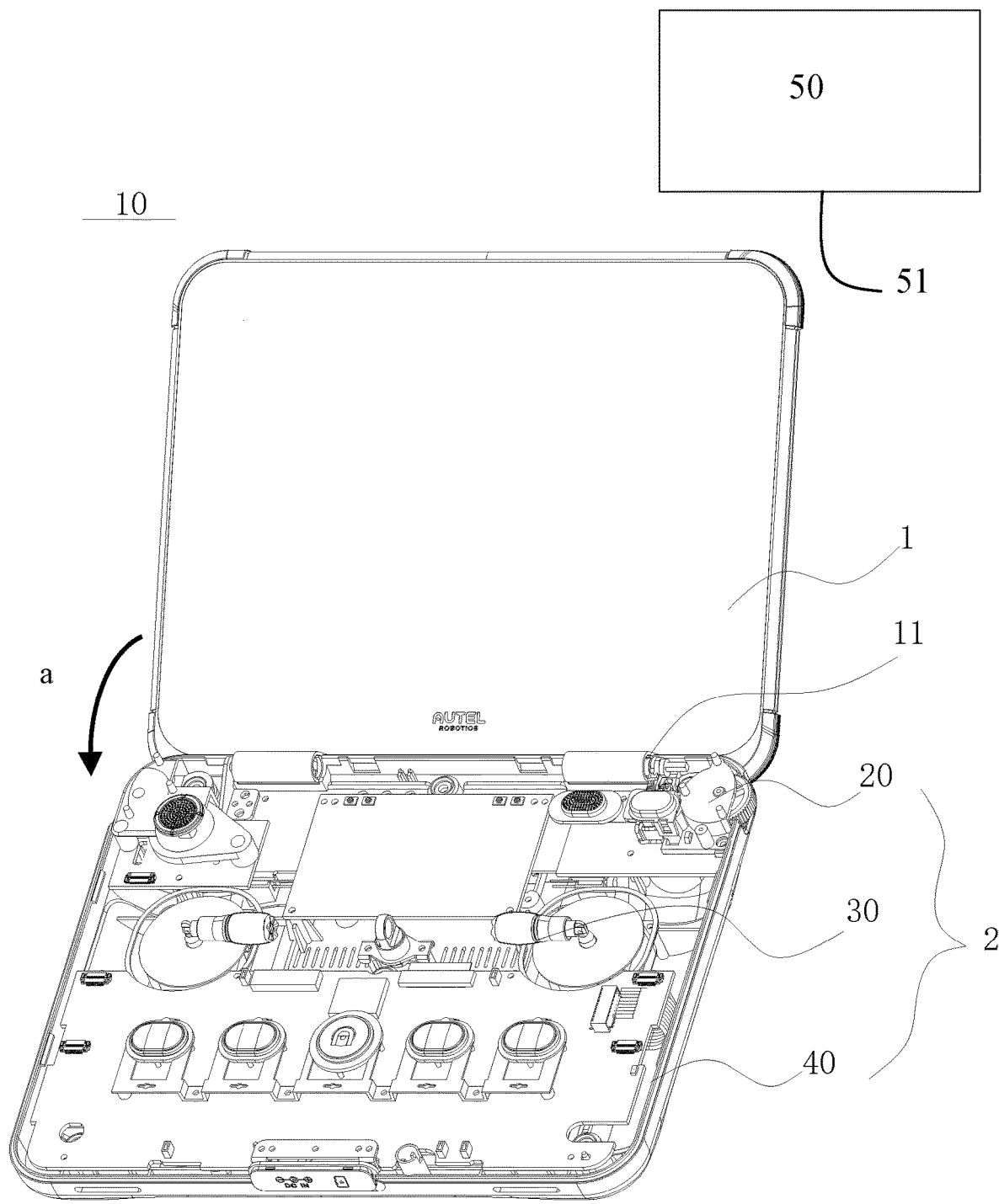
FIG. 2 is a schematic structural diagram of a remote control device according to an embodiment of the present invention.

As shown in FIG. 2, FIG. 2 is a schematic structural diagram of a remote control device according to the present invention. The remote control device 10 includes a display screen 1 and a remote control body 2. The remote control body 2 includes a housing 40, a control mainboard (not shown) disposed in the housing 40, a plurality of operation buttons, two joysticks 30 and a security lock mechanism 20. The display screen 1 is connected to the housing 40 by using a rotating shaft 11, and the display screen 1 can rotate around the rotating shaft 11. The plurality of operation buttons and the two joysticks 30 are electrically connected to the control mainboard, to control up and down, flight directions, flight postures and the like of an unmanned aerial vehicle. The two joysticks 30 can be erected or folded and laid flat relative to the housing 40.

The security lock mechanism 20 is configured to protect the display screen 1. When the display screen 1 is closing, the security lock apparatus 20 is in a first state (that is, a steady lock state), and when the display screen 1 is rotated by an angle α (a range of the angle α is related to the height exceeding the housing 40 when the joystick 30 is erected and a straight-line distance between the joystick 30 and the rotating shaft 11, provided that the display screen 1 does not contact the joystick 30 after being rotated by the angle α), the security lock mechanism 20 locks the display screen, to stop the display screen 1 from being continued to rotate downward (in a direction toward the housing 40), to remind a user to fold and lay the joystick 30 flat, so as to prevent the erected joystick 30 from conflicting with the display screen 1, thereby preventing the display screen 1 from being damaged. The display screen 1 can be continued to rotate downward only when the user presses a button of the security lock mechanism 20 after folding and laying the joystick 30 flat, so that the screen closing is completed. Therefore, the security lock mechanism 20 can have a good protection function.

The security lock mechanism 20 in the present invention is described below in detail.

Figure 3A:
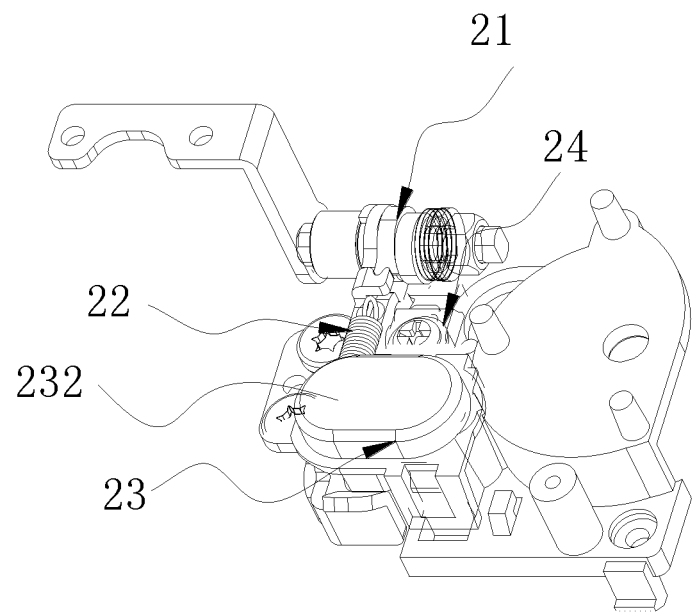
FIG. 3a is a schematic stereogram of a security lock mechanism in a steady lock state according to an embodiment of the present invention.
Figure 3B:
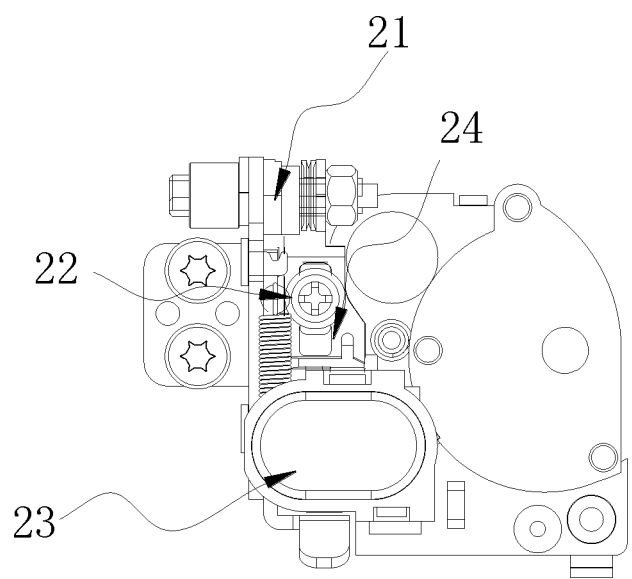
Figure 4:
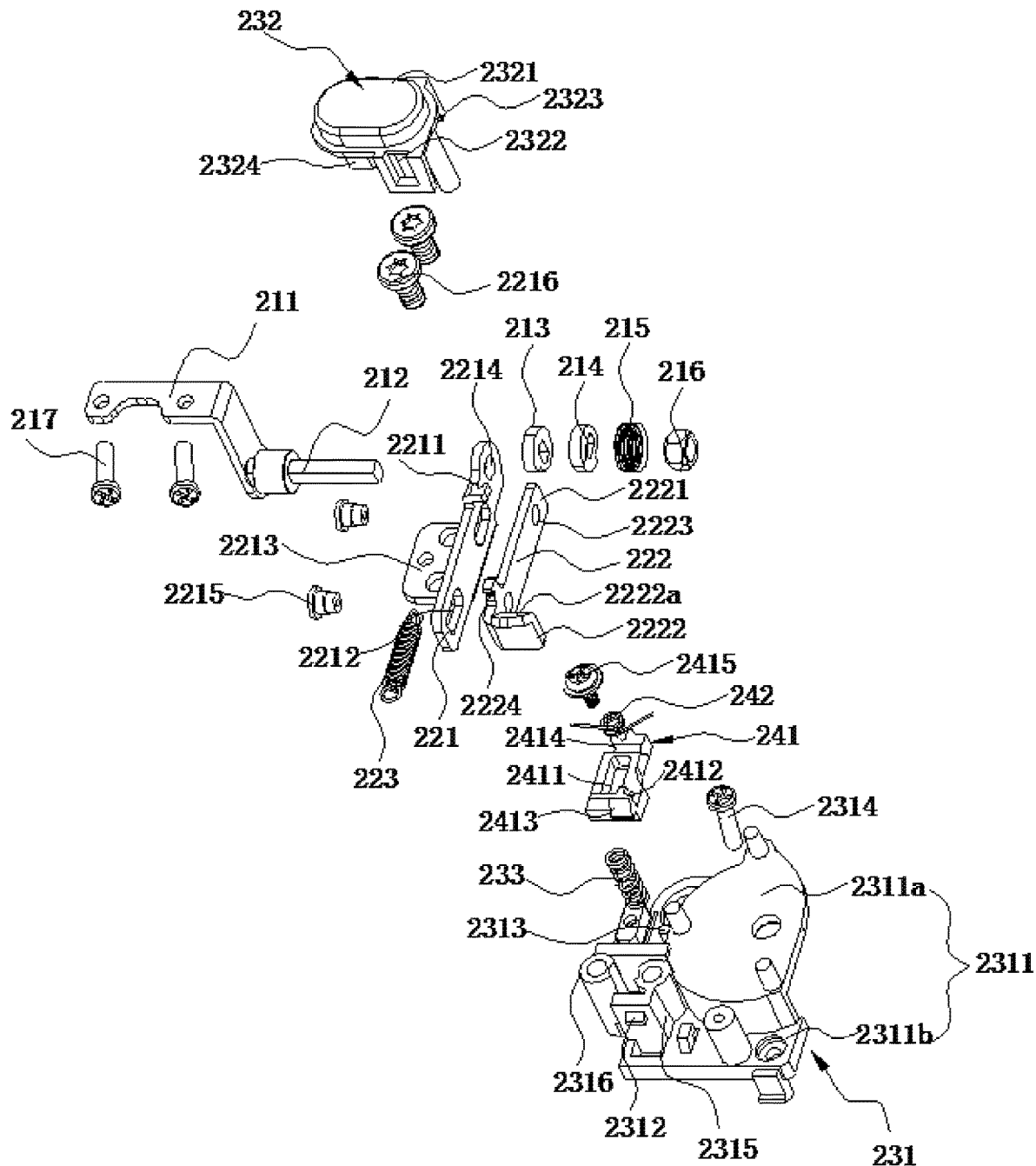
FIG. 4 is an exploded view of a security lock mechanism according to an embodiment of the present invention.

As shown in FIG. 3a, FIG. 3b and FIG. 4, FIG. 3a is a schematic stereogram of a security lock mechanism in a steady lock state according to the present invention, FIG. 3b is a top view of FIG. 3a, and FIG. 4 is an exploded view of a security lock mechanism according to the present invention. The security lock mechanism 20 includes a connection apparatus 21 connected to the rotating shaft 11, a twistlock apparatus 22 mounted in the housing 40, a button apparatus 23 and a button lock apparatus 24.

The connection apparatus 21 includes a screen fixing support 211 and a coupling shaft 212.

The screen fixing support 211 may be a perpendicular bent piece. The screen fixing support 211 includes two right-angled arms that are perpendicular to each other. An end portion of one right-angled arm is fixedly connected to the coupling shaft 212. The other right-angled arm is provided with two through holes. The screen fixing support 211 is fixed on the rotating shaft 11 of the display screen 1 by using two bolts 217 passing through the two through holes.

Further, another screen fixing support is further disposed on the periphery of the rotating shaft 11 of the screen fixing support 211, and the screen fixing support 211 is fixedly connected to the another screen fixing support. In this way, the screen fixing support 211 is fixed on the rotating shaft 11. When the rotating shaft 11 rotates, the screen fixing support 211 rotates with rotation of the rotating shaft 11.

The coupling shaft 212 extends from the screen fixing support 211 in an axial direction of the rotating shaft 11.

The connection apparatus 21 further includes a first bump mechanism 213 and a second bump mechanism 214. Each of the first bump mechanism 213 and the second bump mechanism 214 may be of an independent cam structure. Each of the first bump mechanism 213 and the second bump mechanism 214 may be of an integral structure. Regardless of the integral structure or the independent earn structure, a bump of the first bump mechanism 213 and a bump of the second bump mechanism 214 are staggered with each other, so that the bump of the first bump mechanism 213 and the bump of the second bump mechanism 214 can be respectively engaged with the twistlock apparatus 22 and the button lock apparatus 24 at different moments, so that the security lock mechanism 20 can keep an unlock state in a time length.

The first bump mechanism 213, the second bump mechanism 214, and one end portion (which is described below in detail) of the twistlock apparatus 22 are sleeved over the coupling shaft 212 and are fixed to the coupling shaft 212 by combining a compression spring 215 and a nut 216.

The coupling shaft 212 rotates with rotation of the screen fixing support 211 and drives the first bump mechanism 213 and the second bump mechanism 214 that are fixed to the coupling shaft 212 to rotate.

The twistlock apparatus 22 includes a twistlock fixing support 221, s twistlock body 222 and an elastic connecting piece 223.

The twistlock fixing support 221 includes a base and a main body portion that is perpendicular to the base. The twistlock fixing support 221 is fixed to the housing 40 by using two bolts 2216 passing through two through holes of the base. An end portion that is of the main body portion of the twistlock fixing support 221 and that is close to the connection apparatus 21 is provided with a first hook 2211, and the end portion is provided with a through hole 2214 for the coupling shaft 212 to pass through. The through hole 2214 and the coupling shaft 212 are in clearance fit, so that when rotating, the coupling shaft 212 does not drive the twistlock fixing support 221 to rotate. The main body portion of the twistlock fixing support 221 is further provided with two ellipse-shaped long holes 2212 that are used to connect to the twistlock body 222.

Figure 5A:
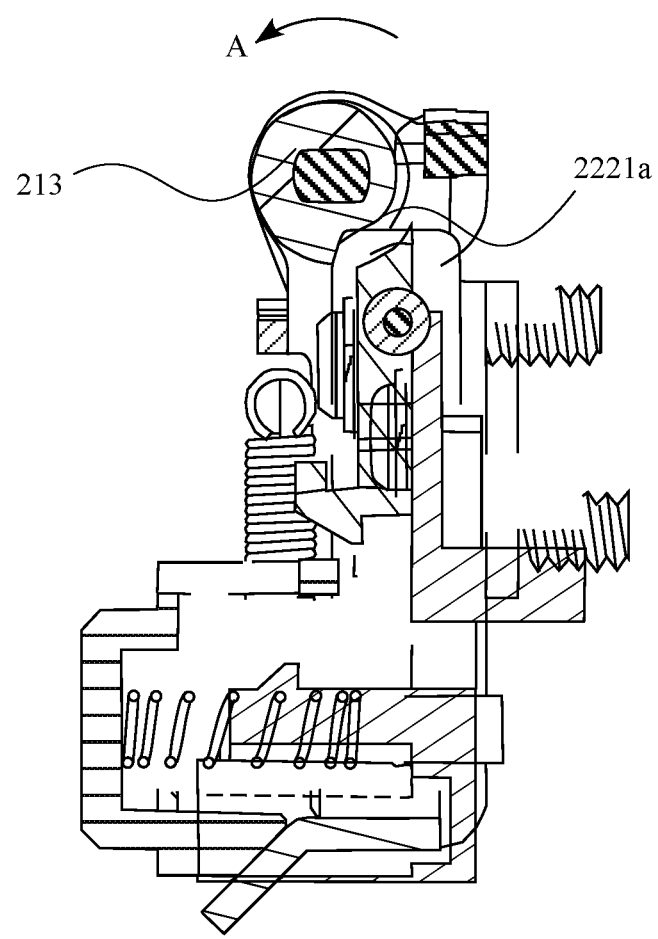
FIG. 5a is a schematic structural diagram of a security lock mechanism when rotation of a display screen is stopped.

An end portion 2221 that is of the twistlock body 222 and that is close to the connection apparatus 21 is provided with a rounded-corner sliding surface 2221a (as shown in FIG. 5a) engaged with the first bump mechanism 213. The other end portion 2222 that is of the twistlock body 222 and that is far away from the connection apparatus 21 is provided with a bent portion. The bent portion is provided with an inclined sliding surface 2222a engaged with the button apparatus 23. The other end portion 2222 is provided with a second hook 2224. Each of the end portion 2221 and the other end portion 2222 is provided with a through hole 2223.

The twistlock fixing support 221 is connected to the twistlock body 222 by using two connecting pieces 2215 respectively passing through the two long holes 2212 of the twistlock fixing support 221 and two through holes 2223 of the twistlock body 222. The long hole 2212 and the connecting piece 2215 are in clearance fit, so that the twistlock body 222 can move relative to the twistlock fixing support 221.

The connecting piece 2215 may be a rivet.

Figure 6:
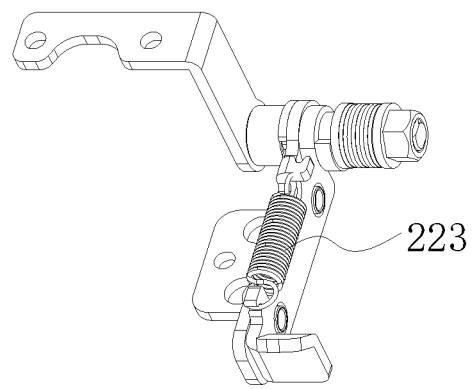
FIG. 6 is a schematic structural diagram clearly showing that a twistlock fixing support is connected to a twistlock body by using an elastic connecting piece.

With reference to FIG. 4 and FIG. 6, FIG. 6 is a schematic structural diagram clearly showing that a twistlock fixing support is connected to a twistlock body by using an elastic connecting piece. One end of the elastic connecting piece 223 is fastened to the first hook 2211 of the twistlock fixing support 221 and the other end is fastened to the second hook 2224 of the twistlock body 222. The twistlock body 222 is in close contact with the twistlock fixing support 221 by using the elastic connecting piece 223.

The elastic connecting piece 223 may be an elastic piece such as a drag spring or a compression spring.

Still referring to FIG. 4, the button apparatus 23 includes a button support 231, a button body 232 and an elastic pressing piece 233.

The button support 231 includes a step-shaped base plate 2311. The base plate 2311 is fixed to the housing 40 by using a bolt 2314. The base plate 2311 includes an upper base plate 2311a and a lower base plate 2311b. The lower base plate 2311a is provided with a mounting wall 2315 configured to mount the button body 232. A protrusion 2312 protrudes from an outer side that is of the mounting wall 2315 and that is close to an edge of the lower base plate 2311b. The protrusion 2312 is configured to engage with the button body 232. The mounting wall 2315 encloses a half-closed space. A cylinder 2316 is disposed in the half-closed space.

Figure 8A:
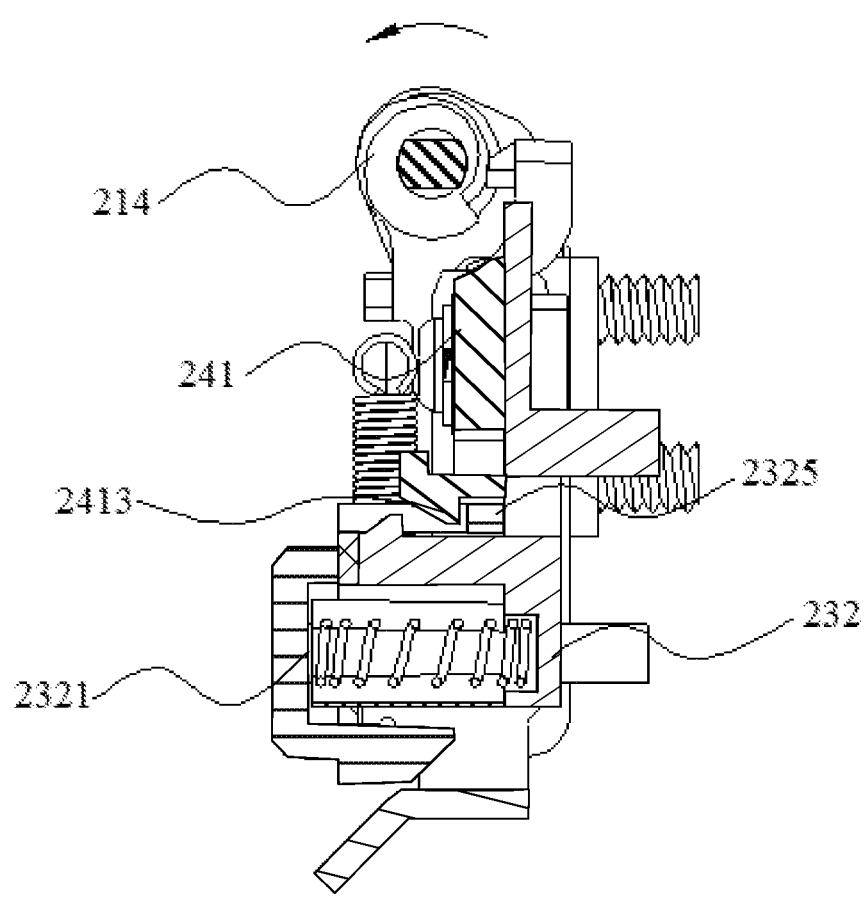
FIG. 8a is a schematic structural diagram in which a button lock apparatus locks a button portion.

The button body 232 includes a side portion edge 2323 engaged with the mounting wall 2315 of the button support 231, a button portion 2321 disposed on the top and a clamping extension portion 2322 extending downward from the side portion edge 2323. The button portion 2321 is disposed in the middle of the side portion edge 2323, and the button portion 2321 can be moved up and down relative to the side portion edge 2323 under action of an external force. The button portion 2321 includes a button bump 2324 extending downward from the top of the button portion 2321 and a clamping portion 2325 (as shown in FIG. 8a). The clamping portion 2325 has an opening used to clamp to a first protrusion of the button lock apparatus 24.

The elastic pressing piece 233 is sleeved over the cylinder 2316 of the button support 231 and is pressed by the button body 232 into an inner cavity of button body 232. When an external force is applied to the button body 232, the button body 232 applies an acting force to the elastic pressing piece 233, to make the elastic pressing piece 233 to compress downward. When the external force on the button body 232 is withdrawn, the elastic pressing piece 233 generates an elastic force for recovering elastic pressing piece 233 to the original shape to bounce upward and return back the button body 232 (in a direction far away from the button support 231), that is, the button body 232 is recovered to the steady lock state.

The elastic connecting piece 233 may be an elastic piece such as a drag spring or a compression spring.

The side portion edge 2323 of the button body 232 is engaged with the mounting wall 2315 of the button support 231. The protrusion 2312 of the button support 231 is clamped to the button body 232 through the opening of the clamping extension portion 2322. The button portion 2321 of the button body 232 can move up and down relative to the base plate 2311 in the inner cavity of the button body 232.

Figure 5B:
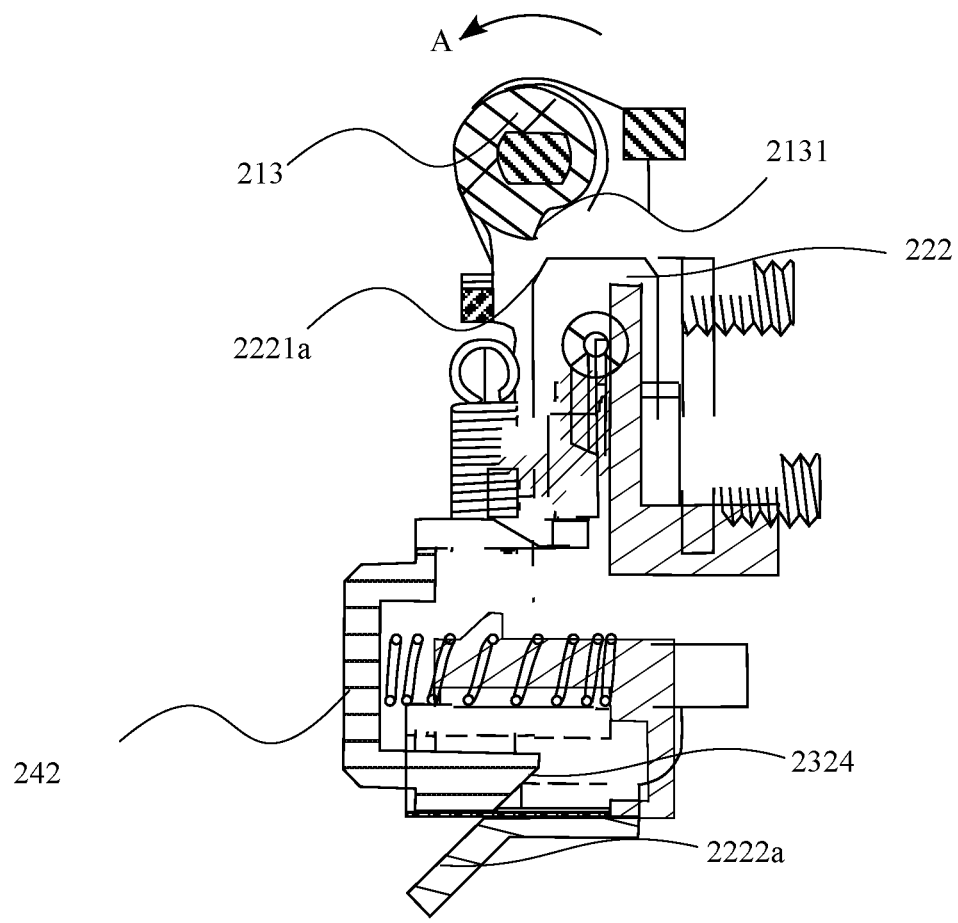
FIG. 5b is a schematic structural diagram of a security lock mechanism when stopping of rotation of a display screen is released.

The button bump 2324 of the button body 232 is located at an inner side of the bent portion of the twistlock body 222. When the button portion 2321 is moved downward under action of an external force, the button bump 2324 is engaged with the inclined sliding surface 2222a of the twistlock body 222 and presses the bent portion to drive the twistlock body 222 to move away from the connection apparatus 21, so that the rounded-corner sliding surface 2221a of the end portion 2221 of the twistlock body 222 is detached from a bump sliding surface 2131 (as shown in FIG. 5b) of the first bump mechanism 213.

The button lock apparatus 24 includes a button lock body 241 and an elastic pushing piece 242.

The middle of the button lock body 241 is provided with a long hole 2411. A fastening piece 2415 is mounted on the button support 231 through the long hole 2411. The fastening piece 2415 and the long hole 2411 are in clearance fit, so that the button lock body 241 can horizontally move relative to the button support 231 (that is, move away from or toward the connection apparatus 21).

Figure 7:
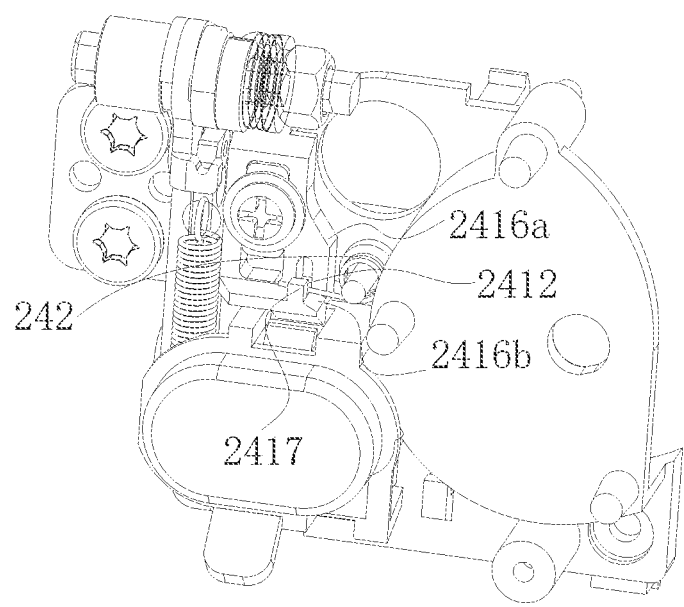
FIG. 7 is a schematic structural diagram clearly showing that an elastic pushing piece cooperates with a button lock body.

With reference to FIG. 4 and FIG. 7, FIG. 7 is a schematic structural diagram clearly showing that an elastic pushing piece cooperates with a button lock body. The button lock body 241 includes a bottom surface 2416a and a side wall 2416b extending upward from the bottom surface 2416a. The side wall 2416b is located at an end portion that is of the button lock body 241 and that is far away from the connection apparatus 21. The side wall 2416b is provided with a bump 2417 extending towards a direction parallel to the bottom surface 2416a. A blocking channel 2412 is formed between the bump 2417 and the bottom surface 2416a. The blocking channel 2412 is used to locate the elastic pushing piece 242.

A strut 2313 is disposed on the button support 231 and the elastic pushing piece 242 is sleeved over the strut 2313. One end of the elastic pushing piece 242 is located in the blocking channel 2412 and the other end freely extends onto the lower base plate 2311b of the button support 231. When an external force is applied to the button body 232, a side portion of the button portion 2321 pushes the elastic pushing piece 242, to make the button lock body 241 to move toward the button body 232, to lock the pressed button body 232.

The elastic pushing piece 242 may be a rotary spring or another elastic piece.

A first protrusion 2413 extends from the side wall 2416b of the button lock body 241 to a length direction of the button lock body 241. The first protrusion 2413 is used to engage with the clamping portion 2325b of the button body 232 (as shown in FIG. 8a). When the button body 232 is moved downward to a preset location under action of an external force, the first protrusion 2413 is clamped to the clamping portion 2325 of the button portion 2321 to lock the button portion 2321, to prevent the pressed button portion 2321 from bouncing upward when the external force disappears.

A second protrusion 2414 extends from one end that is of the button lock body 241 and that is close to the connection apparatus 21 in a width direction of the button lock body 241. When the security lock mechanism 20 is in a second state (that is, the unlock state) and when the display screen 1 is rotated by a preset angle, the second protrusion 2414 contacts the second bump mechanism 214 of the connection apparatus 21, the second bump mechanism 214 acts on the second protrusion 2414 and drags the button lock body 241 to move away from the button body 232, so that the first protrusion 2413 of the button lock body 241 is detached from the button body 232 and the security lock apparatus 20 is switched from the second state to a third state. The third state is an intermediate state in which the steady lock state is not recovered.

A working process and a principle of the security lock apparatus of the present invention is described in detail below.

As shown in FIG. 3a and FIG. 3b, when the security lock apparatus 20 is in the first state (the steady lock state), the button body 232 of the button apparatus 23 is in a bounced state, and the twistlock apparatus 22 and the button lock apparatus 24 are in the steady lock state.

As shown in FIG. 5a, FIG. 5a is a schematic structural diagram of a security lock mechanism when rotation of a display screen is stopped. When the display screen 1 is closing, the display screen 1 is rotated in a first direction indicated by an arrow A, that is, the display screen 1 is rotated towards the housing 40. When the display screen 1 is rotated by an angle, the bump siding surface 2131 of the first bump mechanism 213 of the connection apparatus 21 touches the rounded-corner sliding surface 2221a of the twistlock body 222, and the rounded-corner sliding surface 2221a stops the first bump mechanism 213 from being continued to rotate, to stop the display screen 1 from being rotated in the first direction, so that the screen closing of the display screen 1 is stopped.

As shown in FIG. 5b, FIG. 5b is a schematic structural diagram of a security lock mechanism when stopping of rotation of a display screen is released. When the button portion 2321 of the button apparatus 23 is pressed under action of an external force to move downward, the button bump 2324 of the button body 232 is engaged with the inclined sliding surface 2222a of the twistlock body 222 and presses the bent portion to drive the twistlock body 222 to move away from the connection apparatus 21, so that the rounded-corner sliding surface 2221a of the end portion 2221 of the twistlock body 222 is detached from the bump sliding surface 2131 of the first bump mechanism 213. In this way, stopping of rotation of the first bump mechanism 213 is released, so that stopping of rotation of the display screen 1 is released and the display screen 1 can be continued to move in the first direction.

With reference to FIG. 7 and FIG. 8a, FIG. 8a is a schematic structural diagram in which a button lock apparatus locks a button portion. When the button portion 2321 is continued to move downward under action of an external force, the side portion of the button portion 2321 pushes the elastic pushing piece 242 to rotate, so that the button lock body 241 is moved close to the button body 232. When the button lock body 241 is moved to a preset location, the first protrusion 2413 of the button lock body 241 is clamped to the clamping portion 2325 of the button portion 2321 to lock the button portion 2321, to prevent the pressed button portion 2321 from bouncing upward when the external force disappears. In this case, the security lock mechanism 20 is in the unlock state.

Figure 8B:
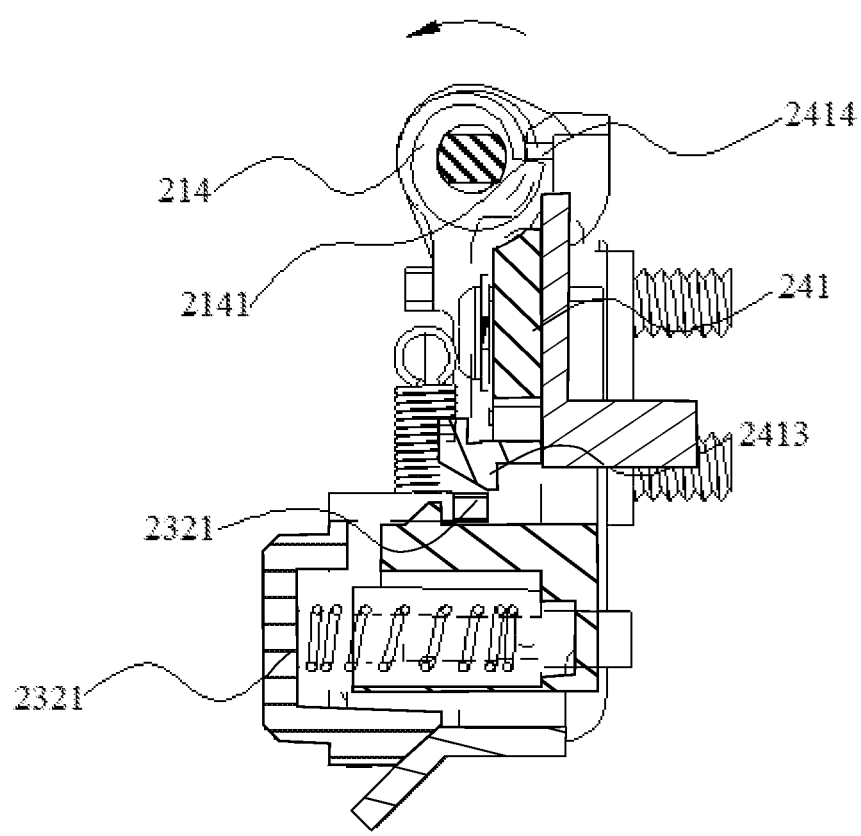
FIG. 8b is a schematic structural diagram in which a second bump mechanism unlocks a button lock apparatus and a button apparatus.

As shown in FIG. 8b, FIG. 8b is a schematic structural diagram in which a second bump mechanism unlocks a button lock apparatus and a button apparatus. When the stopping of rotation of the display screen 1 is released, the display screen 1 is continued to rotate, and when the display screen 1 is rotated by a preset angle, the bump sliding surface 2141 of the second bump mechanism 214 contacts the second protrusion 2414 of the button lock body 241, the bump sliding surface 2141 of the second bump mechanism 214 acts on the second protrusion 2414 and drags the button lock body 241 to move away from the button body 232, to detach the first protrusion 2413 of the button lock body 241 from the clamping portion 2325 of the button portion 2321, so that the button portion 2321 releases the locking and bounces to an initial location under action of the elastic pressing piece 233. The security lock apparatus 20 is switched from the second state to the third state, that is, from the unlock state to the intermediate state.

Figure 9A:
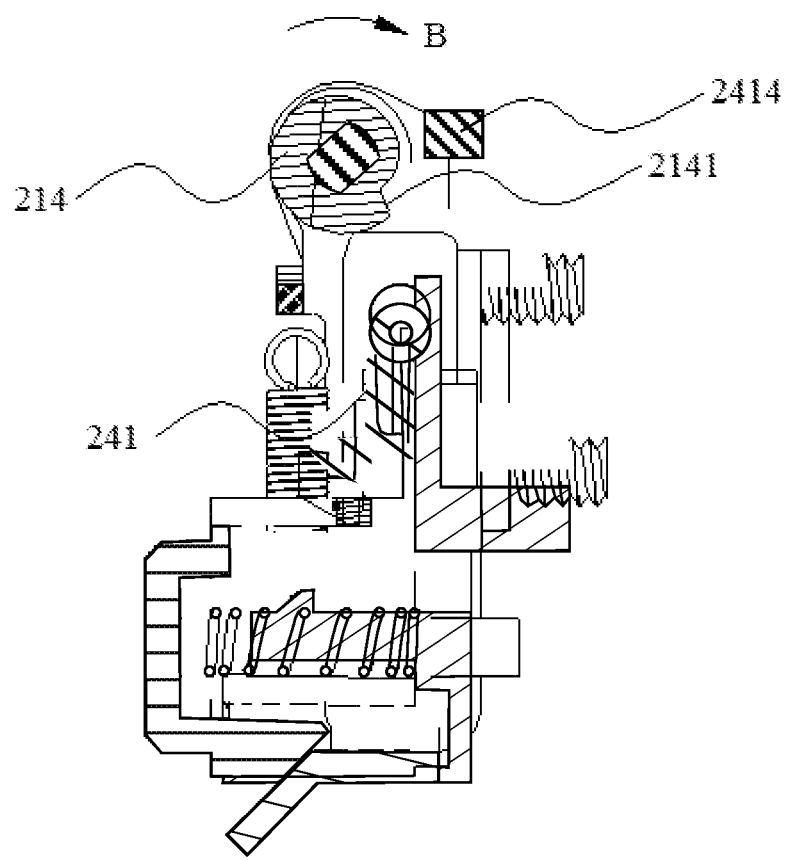
FIG. 9a is a schematic structural diagram of a button lock apparatus when the button lock apparatus is recovered to a steady lock state.

As shown in FIG. 9a, FIG. 9a is a schematic structural diagram of a button lock apparatus when the button lock apparatus is recovered to a steady lock state. When the display screen 1 is opening, the display screen 1 is rotated in a second direction indicated by an arrow B, the second bump mechanism 214 is rotated in the second direction, and the bump sliding surface 2141 is detached from the second protrusion 2414 of the second bump mechanism 214 of the button lock body 241. With reference to FIG. 7, the button lock body 241 is recovered to a location of the steady lock state under action of the elastic pushing piece 242.

Figure 9B:
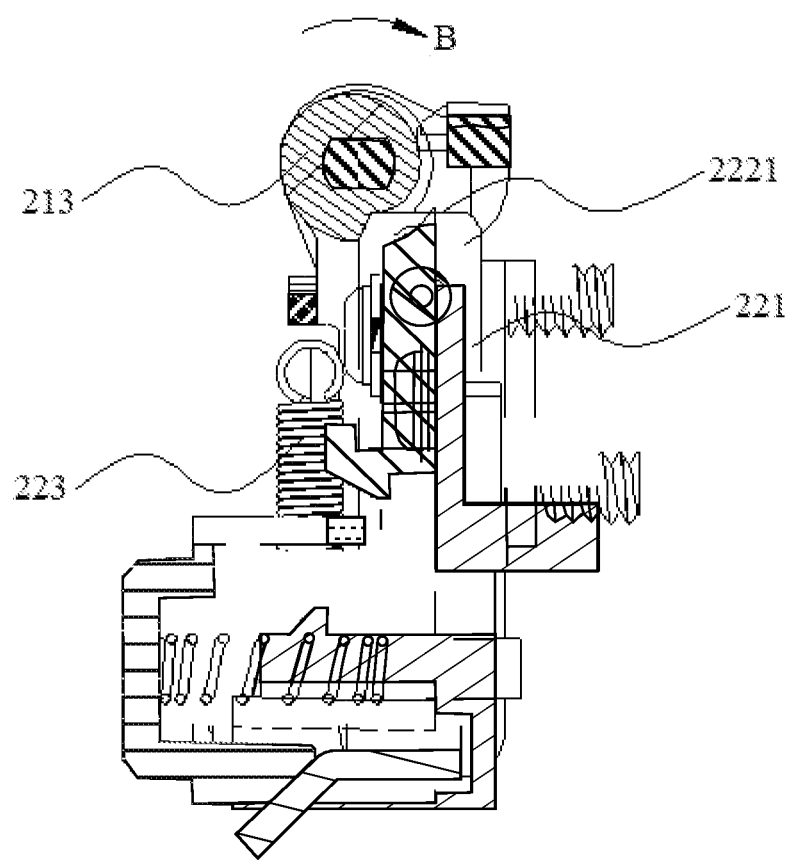
FIG. 9b is a schematic sectional view of a twistlock apparatus when the twistlock apparatus is recovered to a steady lock state.
Figure 9C:
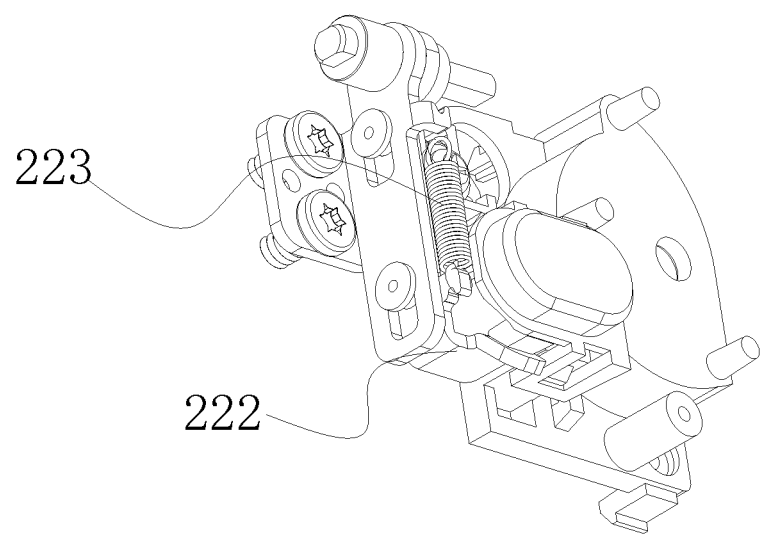
FIG. 9c is a schematic stereostructural diagram of a twistlock apparatus when the twistlock apparatus is recovered to a steady lock state.

With reference to FIG. 9b and FIG. 9c, FIG. 9b is a schematic sectional view of a twistlock apparatus when the twistlock apparatus is recovered to a steady lock state, and FIG. 9c is a schematic stereostructural diagram of a twistlock apparatus when the twistlock apparatus is recovered to a steady lock state. The display screen 1 is continued to rotate in the second direction, and the first bump mechanism 213 is rotated in the second direction and presses the end portion 2221 of the twistlock body 222, so that the twistlock body 222 is moved far away from the first bump mechanism 213 and is limited at the location of the steady lock state under action of an elastic force of the elastic connecting piece 223.

In this way, the security lock apparatus 20 is recovered to the steady lock state again. When the display screen is closing, the security lock apparatus 20 can lock the display screen again.

In addition, in the foregoing embodiments, locking of the button apparatus is implemented by using the button lock apparatus. However, in another embodiment, there may be no need to set the button lock apparatus. For example, the security lock mechanism may keep the unlock state for a period of time by long pressing the button lock apparatus, to leave sufficient time for the user to rotate the display screen.

In the remote control device of the present invention, the security lock apparatus is disposed in the housing. When the display screen is closing and is rotated by an angle to lock the display screen to stop the display screen from being continued to rotate. When an external force is applied to the security lock apparatus, the security lock apparatus removes the stopping to the display screen, so that the display screen is continued to rotate to complete the screen closing. In the present invention, the user is reminded to fold and lay the joystick of the remote control device flat by using the security lock mechanism. In this way, a case in which during the screen closing, the display screen conflicts with the joystick that is not laid flat is avoid, thereby preventing the display screen from being damaged.

It may be understood that the foregoing remote control device may be applied to any application scenario in which the remote control device may be used, for example, robot control, game machine control, or unmanned aerial vehicle control. The application scenario of the remote control device is not strictly limited in the present invention.

The present invention further provides an unmanned aerial vehicle 50, including a body 51 of the unmanned aerial vehicle 50 and the foregoing remote control device described above. The remote control device is configured to control the body of the unmanned aerial vehicle to fly.

The foregoing descriptions are merely preferred feasible embodiments of the present invention and are not intended to limit the protection scope of the present invention. Any equivalent structural modification made according to the content of this specification and accompanying drawings in the present invention are within the protection scope of the present invention.

What is claimed is:

1. A remote control device, comprising:
    a display screen;
    a rotating shaft; and
    a remote control body, comprising:
        a housing;
        a joystick, disposed in the housing, wherein the joystick is capable of being erected or laid flat relative to the housing; and
        a security lock mechanism, disposed in the housing, wherein
        the display screen is connected to the housing by using the rotating shaft and the display screen can rotate around the rotating shaft, and the security lock mechanism is connected to the rotating shaft;
        when the display screen is rotated towards the housing by an angle during screen closing, the security lock mechanism in a first state locks the display screen to stop the display screen from being continued to rotate; and
        when an external force is applied to the security lock mechanism, the security lock mechanism is switched from the first state to a second state, wherein the display screen is not locked and is permitted to continue to rotate to complete the screen closing;
    wherein the security lock mechanism comprises:
        a connection apparatus, connected to the rotating shaft, wherein the connection apparatus comprises a first bump mechanism, and the first bump mechanism can rotate with rotation of the rotating shaft;
        a twistlock apparatus, mounted in the housing, wherein when the first bump mechanism rotates with rotation of the rotating shaft by an angle, an end portion that is of the twistlock apparatus and that is adjacent the connection apparatus is engaged with the first bump mechanism to stop rotation of the connection apparatus to stop rotation of the display screen; and
        a button apparatus, mounted in the housing and engaged with the twistlock apparatus, wherein when the external force is applied to the button apparatus, the twistlock apparatus is driven to move away from the connection apparatus, the end portion of the twistlock apparatus is detached from the first bump mechanism and the rotating shaft drives the first bump mechanism to continue to rotate.

2. The remote control device according to claim 1, wherein the connection apparatus further comprises:
    a screen fixing support, fixedly connected to the rotating shaft, wherein the screen fixing support rotates with rotation of the rotating shaft; and a coupling shaft, fixedly connected to the screen fixing support, wherein the coupling shaft rotates with rotation of the screen fixing support, and
    the first bump mechanism is sleeved over the coupling shaft and rotates with rotation of the coupling shaft.

3. The remote control device according to claim 1, wherein the twistlock apparatus comprises:
    a twistlock fixing support, fixed in the housing, wherein an end portion that is close to the connection apparatus is provided with a first hook;
    a twistlock body, wherein an end portion that is far away from the connection apparatus is provided with a second hook; and
    an elastic connecting piece, wherein one end of the elastic connecting piece is fastened to the first hook of the twistlock fixing support and the other end is fastened to the second hook of the twistlock body.

4. The remote control device according to claim 3, wherein the twistlock fixing support is provided with a long hole, the twistlock body is provided with a through hole, the twistlock body is connected to the twistlock fixing support by using a connecting piece passing through the long hole of the twistlock fixing support and the through hole of the twistlock body, the connecting piece and the long hole are in clearance fit, and the twistlock body can move relative to the twistlock fixing support.

5. The remote control device according to claim 1, wherein the button apparatus comprises:
a button support, mounted in the housing; and
a button body, mounted on the button support, wherein a button portion of the button body is capable of being moved downward the button support under action of the external force, wherein
a side portion of the button body is provided with a button bump, the other end portion of the twistlock apparatus is provided with a bent portion that cooperates with the button portion of the button body, the bent portion is located at an outer side of the button bump, and when the button portion is moved downward, the button bump of the button body presses the bent portion, to drive the twistlock apparatus to move away from the connection apparatus.

6. The remote control device according to claim 5, wherein the button apparatus further comprises an elastic pressing piece provided in an inner cavity of the button body, the elastic pressing piece is sleeved over a cylinder on the button support, and the button body is capable of being bounced and returned back under action of an elastic force of the elastic pressing piece.

7. The remote control device according to claim 5, wherein the bent portion has an inclined sliding surface engaged with the button bump.

8. The remote control device according to claim 5, wherein the side portion of the button body is provided with a clamping extension portion, the button support has a mounting wall configured to mount the button body, a side surface of the mounting wall is provided with a protrusion, and the protrusion is clamped to an opening of the clamping extension portion.

9. The remote control device according to claim 5, wherein the security lock mechanism further comprises a button lock apparatus, and the button lock apparatus comprises:
a button lock body, mounted on the button support, wherein the button lock body can horizontally move relative to the button support, one end portion that is of the button lock body and that is far away from the connection apparatus is provided with a blocking channel, and a first protrusion extends from the end portion to a length direction of the button lock body; and
an elastic pushing piece, sleeved over a strut of the button support, wherein one end of the elastic pushing piece is located in the blocking channel and the other end freely extends onto a base plate of the button support, and
when the external force is applied to the button body, a side portion of the button portion pushes the elastic pushing piece to rotate, to make the button lock body to move toward the button body, and when the button lock body is moved to a preset location, the first protrusion of the button lock body locks the button portion, to stop the button portion from bouncing upward when the external force is withdrawn.

10. The remote control device according to claim 9, wherein the button portion is provided with a clamping portion, the clamping portion has an opening, and the button lock body locks the button portion by clamping the first protrusion and the clamping portion.

11. The remote control device according to claim 9, wherein the connection apparatus further comprises a second bump mechanism, and the second bump mechanism rotates with rotation of the rotating shaft;
in a width direction of the button lock body, a second protrusion extends from one end that is of the button lock body and that is close to the connection apparatus; and
the second protrusion is configured to cooperate with the second bump mechanism, to drag the button lock body to move away from the button body under action of the second bump mechanism to the second protrusion, so that the first protrusion of the button lock body is detached from the button body, the button body bounces and returns back under action of an elastic force of the elastic pressing piece, the security lock mechanism is switched from the second state to a third state, the first state is a steady lock state, the second state is an unlock state, and the third state is an intermediate state in which the steady lock state is not recovered.

12. The remote control device according to claim 11, wherein a bump of the first bump mechanism and a bump of the second the bump mechanism are staggered.

13. The remote control device according to claim 11, wherein each of the first bump mechanism and the second bump mechanism is of an independent cam structure, or the first bump mechanism and the second the bump mechanism are of an integral structure.

14. The remote control device according to claim 9, wherein the middle of the button lock body is provided with a long hole, the button lock apparatus is mounted on the button support of the button apparatus by using a fastening piece passing through the long hole, and the fastening piece fits clearance of the long hole.

15. An unmanned aerial vehicle, comprising a body of the unmanned aerial vehicle and a remote control device, the remote control device being configured to control the body of the unmanned aerial vehicle to fly,
wherein the remote control device comprises:
a display screen;
a rotating shaft; and
a remote control body, comprising:
a housing;
a joystick, disposed in the housing, wherein the joystick is capable of being erected or laid flat relative to the housing; and
a security lock mechanism, disposed in the housing, wherein
the display screen is connected to the housing by using the rotating shaft and the display screen can rotate around the rotating shaft, and the security lock mechanism is connected to the rotating shaft;
when the display screen is rotated towards the housing by an angle during screen closing, the security lock mechanism in a first state locks the display screen to stop the display screen from being continued to rotate; and
when an external force is applied to the security lock mechanism, the security lock mechanism is switched from the first state to a second state, wherein the display screen is not locked and is permitted to continue to rotate to complete the screen closing;
wherein the security lock mechanism comprises:
a connection apparatus, connected to the rotating shaft, wherein the connection apparatus comprises a first bump mechanism, and the first bump mechanism can rotate with rotation of the rotating shaft;
a twistlock apparatus, mounted in the housing, wherein when the first bump mechanism rotates with rotation of the rotating shaft by an angle, an end portion that is of the twistlock apparatus and that is adjacent the connection apparatus is engaged with the first bump mechanism to stop rotation of the connection apparatus to stop rotation of the display screen; and a button apparatus, mounted in the housing and engaged with the twistlock apparatus, wherein when the external force is applied to the button apparatus, the twistlock apparatus is driven to move away from the connection apparatus, the end portion of the twistlock apparatus is detached from the first bump mechanism and the rotating shaft drives the first bump mechanism to continue to rotate.

16. The remote control device according to claim 15, wherein the connection apparatus further comprises:

a screen fixing support, fixedly connected to the rotating shaft, wherein the screen fixing support rotates with rotation of the rotating shaft; and a coupling shaft, fixedly connected to the screen fixing support, wherein the coupling shaft rotates with rotation of the screen fixing support, and the first bump mechanism is sleeved over the coupling shaft and rotates with rotation of the coupling shaft.

17. The remote control device according to claim 15, wherein the twistlock apparatus comprises:

a twistlock fixing support, fixed in the housing, wherein an end portion that is close to the connection apparatus is provided with a first hook;

a twistlock body, wherein an end portion that is far away from the connection apparatus is provided with a second hook; and an elastic connecting piece, wherein one end of the elastic connecting piece is fastened to the first hook of the twistlock fixing support and the other end is fastened to the second hook of the twistlock body.

18. The remote control device according to claim 17, wherein the twistlock fixing support is provided with a long hole, the twistlock body is provided with a through hole, the twistlock body is connected to the twistlock fixing support by using a connecting piece passing through the long hole of the twistlock fixing support and the through hole of the twistlock body, the connecting piece and the long hole are in clearance fit, and the twistlock body can move relative to the twistlock fixing support.

* * * * *